United States Patent [19]

Lorenz

[11] Patent Number: 5,316,339
[45] Date of Patent: May 31, 1994

[54] SAFETY BELT GRIPPING MECHANISM

[75] Inventor: David A. Lorenz, Anaheim Hills, Calif.

[73] Assignee: Pacific Scientific Company, Yorba Linda, Calif.

[21] Appl. No.: 708,736

[22] Filed: May 31, 1991

[51] Int. Cl.⁵ .............................................. B60R 22/00
[52] U.S. Cl. .................... 280/806; 297/478; 297/480
[58] Field of Search .............. 280/806, 808, 801, 807, 280/801 R; 297/480, 483, 486, 476, 478, 479; 244/122 R, 122 B; 242/107.2

[56] References Cited

U.S. PATENT DOCUMENTS

| | | | |
|---|---|---|---|
| 2,708,555 | 5/1955 | Heinemann et al. | 280/806 |
| 3,205,004 | 9/1965 | Spouge | 280/806 |
| 3,551,961 | 1/1971 | Nygren | 297/475 X |
| 3,817,473 | 6/1974 | Board et al. | 297/476 X |
| 4,185,791 | 1/1980 | Takada | 297/476 X |
| 4,243,185 | 1/1981 | Motonami et al. | 242/107.4 A |
| 4,306,735 | 12/1981 | Pfeiffer et al. | 280/807 |
| 4,310,176 | 1/1982 | Furusawa et al. | 297/474 X |
| 4,323,204 | 4/1982 | Takada | 242/107.2 |
| 4,438,551 | 3/1984 | Imai | 297/478 X |
| 4,494,774 | 1/1985 | Fohl | 280/806 |
| 4,687,253 | 8/1987 | Ernst et al. | 297/478 |
| 4,718,148 | 1/1988 | McKernon et al. | 24/170 |
| 4,854,644 | 8/1989 | Ernst | 297/476 |

FOREIGN PATENT DOCUMENTS

| | | | |
|---|---|---|---|
| 175246 | 3/1986 | European Pat. Off. | 280/807 |
| 305598 | 10/1968 | Sweden | 297/476 |

Primary Examiner—Margaret A. Focarino
Assistant Examiner—Paul Dickson
Attorney, Agent, or Firm—Knobbe, Martens, Olson & Bear

[57] ABSTRACT

A belt gripping mechanism distanced from a belt payout reel including a support housing, a clamping assembly and a locking assembly, which functions in response to a predetermined load to grip a restraint belt in an effectively permanent manner so as to not be immediately releasable upon the cessation of forces which initially triggered the gripping. During emergency crash situations, the locking of the belt payout reel causes the clamping assembly to move from a locked "non-gripping" position to a locked "gripping" position significantly reducing the forward movement of the vehicle passenger.

17 Claims, 2 Drawing Sheets

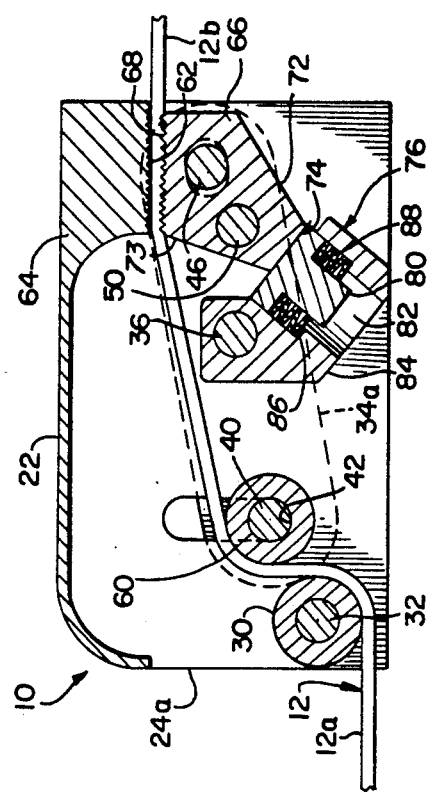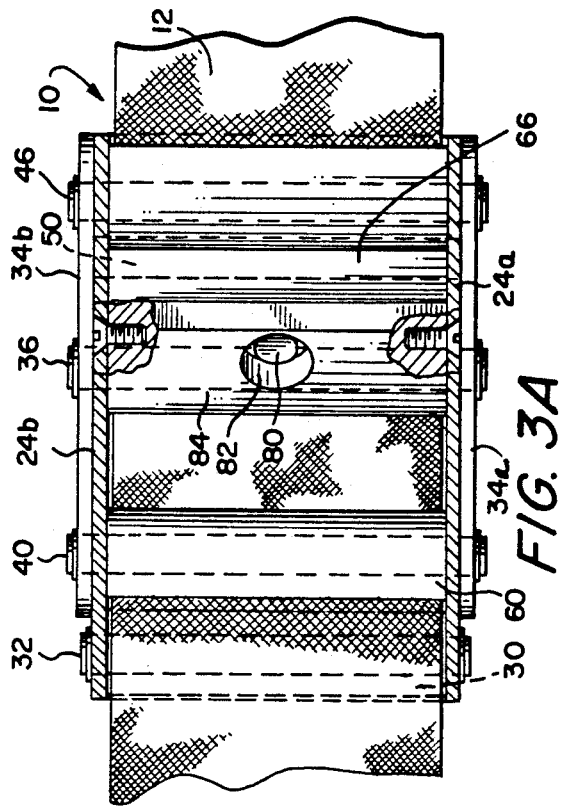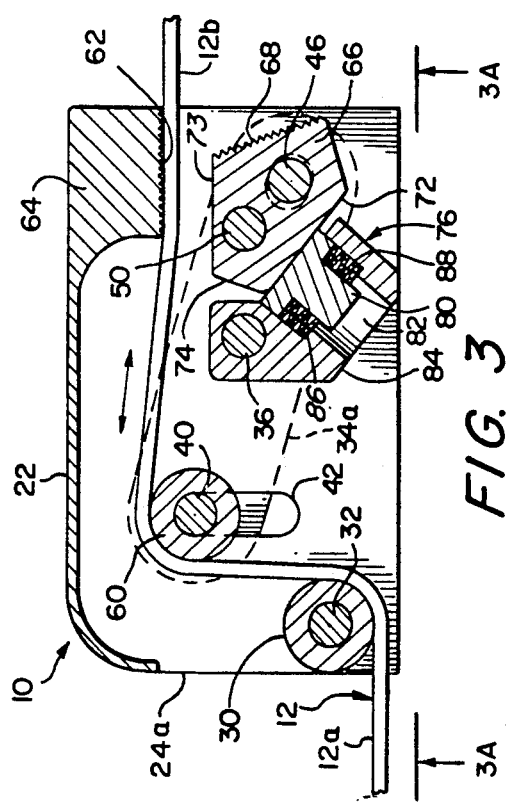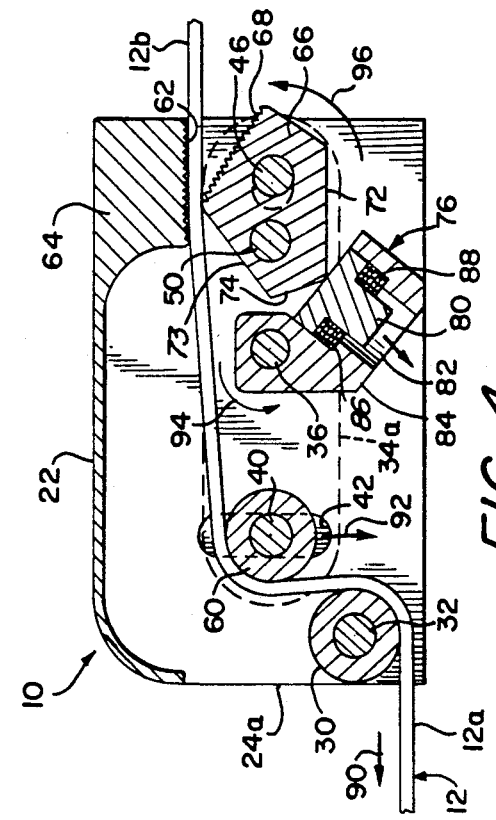

SAFETY BELT GRIPPING MECHANISM

BACKGROUND OF THE INVENTION

The present invention relates generally to clamping mechanisms and particularly to a restraint belt clamping mechanism having a locking assembly.

FIELD OF THE INVENTION

Typically, the safety belt on a vehicle consists of two discrete portions which are connected about the occupant to create a preferably snug fit. A first portion of the safety belt is permanently secured to the vehicle at one end in a payout fashion, i.e., in a retractable payout reel. Adjustably positioned on the first portion of the belt is a belt buckle insert which is connectable to a belt buckle located on the second portion of the safety belt. It is intended that the shoulder portion of the belt be wrapped about the passenger in a manner which includes fastening the belt buckle insert into the belt buckle generally positioned on the lower torso of the occupant.

Under normal vehicle and occupant circumstances, the supply of safety belt stored in the payout reel may be extended or "paid out" unhindered. Gradual forward movement of the passenger against the safety belt will cause the belt to be paid out. Most often, the payout reel is part of an assembly which includes a lockable latch for preventing further payout of the belt upon sudden application of the brakes or upon collision. Advantageously, any sudden vehicle deceleration (or belt payout acceleration) typically causes the latch to lock, thereby preventing further unwinding of the payout reel on which the belt is wound and thus further payout. If the safety belt is securely worn about the occupant, upon the sudden application of the brakes or upon collision, the occupant in the vehicle is thrown forward against the safety belt causing accelerated payout of the restraint belt. This accelerated payout triggers the latch on the reel, thus restraining the occupant from further forward movement with the desirable result of decreasing the risk of occupant injury.

Despite the resistance to forward movement provided by the payout reel latch, an occupant under a strong forward momentum may continue to move forwardly for another inch or two after the latch is locked. The additional forward movement is attributable to portions of the belt becoming packed more tightly around the payout reel by the load on the belt under excessive forward occupant momentum. Further contributing to the additional forward movement is the stretching of the belt material itself under tensile loads. While additional movement may not be very critical when the occupant is in a spacious environment, in many vehicles, such as military aircraft, space is very limited. As such, allowing the occupant's body to move forward two additional inches can be crucial, possibly resulting in serious injury under severe impacts.

To minimize this problem, devices have been developed which address the continued forward movement of the occupant in a vehicle after the payout reel latch is locked. Generally positioned between the payout reel and the occupant, these devices incorporate a belt gripping mechanism which is capable of gripping the belt which passes therethrough. The intent of the gripping mechanisms is to restrict additional payout of the belt, after the payout reel latch is locked, by eliminating the tensile load on that portion of the belt stored on the payout reel. The result is the elimination of undesired belt packing about the payout reel since it is no longer subjected to a load.

In addition to eliminating belt packing, the belt gripping mechanisms are intended to be placed at a location which reduces belt stretching effects; preferably proximate the occupant's shoulder. Without the employment of a belt gripping mechanism in a vehicle, the amount of restraint belt subjected to stretching extends from the payout reel to the belt buckle referred to above. By placing a belt gripping mechanism close to the occupant, the length of belt subjected to stretching is reduced to the portion between the gripping mechanism and the belt buckle. Often, the gripping mechanism may be mounted directly to the back of the occupant's seat.

Various embodiments of belt gripping mechanisms are disclosed in the patent to Takada, U.S. Pat. No. 4,323,204. Specifically, FIGS. 3-5 of the Takada patent disclose a device which includes a pivoting lever arm with a single guide roller secured at one end of the lever arm. The other end of the lever arm includes a toothed surface. A restraint belt is directed about the guide roller on the lever arm such that a forward load on the belt directs the guide roller end of the lever arm outwardly. This outward movement pushes the toothed surface of the arm lever into engagement with a corresponding toothed locking bar, firmly gripping the belt therebetween.

The patent to Takada also discloses in FIGS. 8-12 the concept of two guide rollers being mounted at opposing ends of a pivoting lever arm wherein the lever arm pivots about an axis supporting one of the two guide rollers. The lever arm also includes a toothed surface. In addition, a restraint belt extends between the two rollers such that a forward force on the belt causes the lever arm to pivot, thereby clamping the belt between the toothed surface and a stationery lock bar.

Another type of gripping mechanism is disclosed in FIGS. 15-16 of Takada. There a safety belt extends over an independently-supported guide roller journaled within slots in opposing support walls. The guide roller slidably engages, through a support axle, a pivoting clamping arm in such a fashion that forward forces on the safety belt slide the guide roller within the slots so as to push the clamping arm into engagement with a fixed clamping member. In that position, the belt is clamped between the clamping arm and the clamping member. Both the guide roller and the pivoting clamping arm are held in a normally non-clamping position away from the fixed clamping member by springs. Other belt gripping systems are disclosed in U.S. Pat. No. 4,306,735 to Pfeiffer, et al., U.S. Pat. No. 4,494,774 to Fohl, and U.S. Pat. No. 4,718,148 to McKernon, et al.

While many safety belt gripping mechanisms provide satisfactory results, most are designed to release the belt when the load exerted by the forward momentum of the occupant decreases These gripping mechanisms are often designed to be triggered relatively easily in anticipation of the frequent sudden stops associated with travelling at excessive speeds or traffic congestion. As such, they are readily releasable to permit continued normal operation of the vehicle after the triggering event has elapsed. While it may be desirable for belt grabbing mechanisms in automobiles to be triggered and released frequently when the load respectively increases or decreases, certain military aircraft uses dictate otherwise. For military aircraft, the need to frequently activate the belt gripping mechanism is not important because it is anticipated that the only time the belt will be subjected to a significant load is in a crash situation.

Current gripping mechanisms do not incorporate a means for locking the gripping mechanism virtually permanently in place in either a "clamping" position or a "non-clamping" position so as to avoid undesired gripping. As such, a need exists for a safety belt gripping mechanism which is capable of being locked in a non-clamping position for activation only in crash or near crash situations and in a clamping position to preclude the release of the belt following the cessation of abrupt forward momentum forces.

SUMMARY OF THE INVENTION

The present invention is an improved belt gripping mechanism which functions in response to a predetermined load to grip a restraint belt in an essentially permanent manner. The mechanism comprises a support housing, a clamping assembly and a locking assembly and is configured to be securable to a vehicle, such as military aircraft, or transport, preferably proximate to the person being restrained. With this arrangement, belt packing about the payout reel is eliminated and the amount of the restraint belt subjected to "belt stretching" is effectively minimized In addition, the present belt gripping mechanism is configured to slidably accept a restraint belt therethrough, wherein load on the belt is channelled to the clamping assembly by means for activating the clamping assembly and the locking assembly.

In a preferred form of the invention, the frame for the clamping mechanism has a generally U-shaped configuration and includes a ribbed clamping surface engageable with a portion of the clamping assembly to clamp the restraint belt therebetween. The clamping assembly is mechanically maneuverable and responds to load on the restraint belt passing through the belt gripping mechanism. In addition, the clamping assembly comprises a pair of centrally pivotable lever arms each supporting a first guide roller at one end and a clamping cam at the other end. The lever arms are alternatively pivotable between a "clamping" position and a "non-clamping" position, both being lockable thereat, as discussed below. A second guide roller is journaled within the housing such that the belt passes over the first and second guide roller in an "S-shaped" fashion. The clamping cam also includes a ribbed surface for gripping the restraining belt in conjunction with the ribbed surface of the frame. In addition, the clamping cam is itself pivotable about a first cam axle secured within the frame and is journaled about a second cam axle responsive to movement of the two lever arms. With this arrangement, rotation of the lever arms causes simultaneous rotation of the clamping cam about the first cam axle to bring the ribbed surface of the clamping cam into engagement with the ribbed surface of the frame, thereby gripping the restraint belt therebetween.

Unique to the present invention is a locking assembly which is configured to engage a plurality of adjacent surfaces on the clamping cam so as to permit the clamping cam to be alternatively locked in clamping and non-clamping positions. In the preferred embodiment, the locking assembly comprises a piston movable in a reciprocating fashion within a piston housing. A plurality of Bellville washers are positioned at the base of the piston such that a continuous force is outwardly exerted against the piston, compressively engaging the piston against the clamping cam.

The gripping mechanism is normally positioned in a non-clamping position, thus permitting free travel of the restraint belt therethrough. In the event of a crash or an abrupt decelerated forward movement sufficient to activate the locking reel, the resulting increased load on the belt overcomes the locking force of the Bellville washers and the lever arms direct the clamping cam into a locked clamping position. The restraint belt is then securely clamped between the ribbed surfaces of the clamping cam and the frame, thus isolating the load from the reel and preventing further forward movement of the passenger with a minimal of belt stretching. Since the load is transferred to the belt gripping mechanism, the reel locking assembly can be less rugged than would be required if the reel were to receive the entire load. Other advantages of the present invention will be appreciated from the detailed description below.

BRIEF DESCRIPTION OF THE DRAWINGS

FIG. 3 is a cross-sectional view of the embodiment of FIG. 2, taken along the line 3—3, wherein the clamping cam is shown locked in a "non-clamping" position.

FIG. 3A is a bottom plan view of the gripping mechanism on line 3A—3A.

FIG. 4 is a cross-sectional view of the device of FIG. 3, wherein the clamping cam is shown unlocked in an intermediary position.

FIG. 5 is a cross-sectional view of the device of FIG. 3 wherein the clamping cam is shown locked in a clamping position.

DETAILED DESCRIPTION

Figure 1:
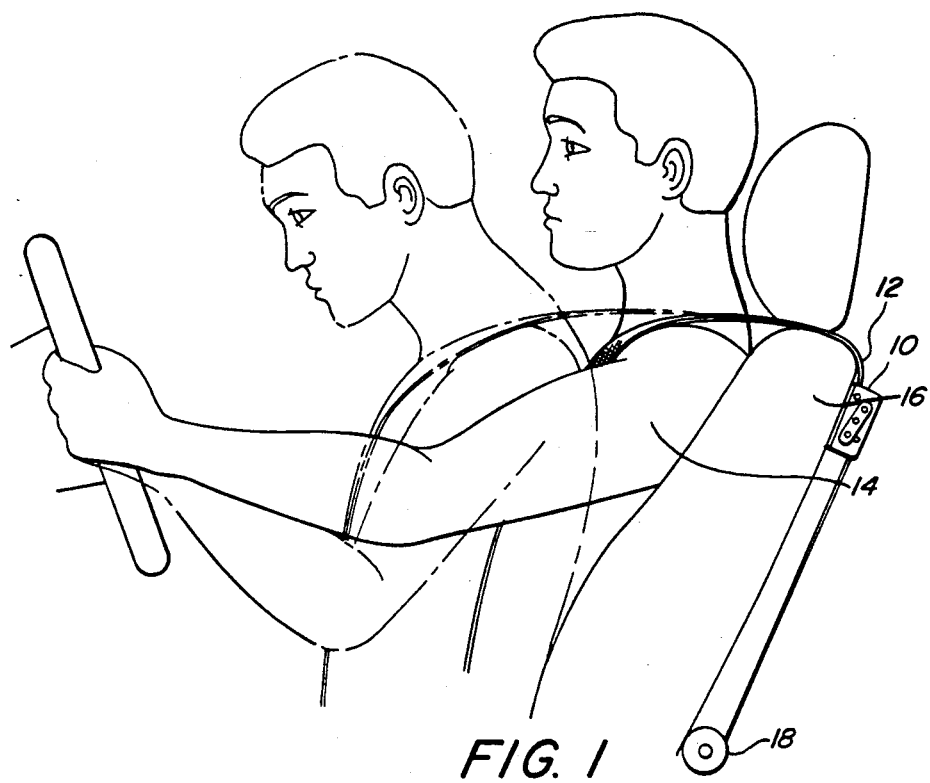
FIG. 1 is a schematic side view of a pilot in an aircraft wherein the present invention gripping mechanism is shown positioned proximate to the shoulder of the pilot.

Reference is now made to the Figures wherein like elements are designated with like numerals. Referring specifically to FIG. 1, the present invention comprises a belt gripping device 10 for use with a conventional restraint belt 12 in a military aircraft (not shown). The belt gripping device 10 is intended to be secured mounted within the aircraft preferably on the back of the frame of seat 16 in a manner which permits the passage of the restraint belt 12 therethrough.

The restraint belt 12 in FIG. 1 consists of an elongate strap of textile material which is designed to be secured about the shoulder and/or waist of an occupant 14 for safety purposes. A first end of the restraint belt 12 is stored in a payout fashion on a payout reel 18 secured in the vehicle. Located at a position intermediate the payout reel 18 is a buckle insert (not shown) which is insertable into a buckle (not shown) located at the lower torso of the occupant 14 for securing the restraint belt 12 about the occupant 14. Under normal conditions, the restraint belt 12 is extended about the occupant 14 in a manner which restrains the occupant 14 from excessive forward movement in crash or near crash situations, i.e., in instances of sudden deceleration of the vehicle.

Typically, the payout reel 18 is designed to operate in response to periods of sudden deceleration so as to prevent continued payout of the restraint belt 12. Since there are many known reels that automatically lock and unlock in response to acceleration or velocity, the details of such a device are not shown but the reel 18 has such capability. Also vehicle movement sensors can be linked to the reel lock mechanism. Under normal dynamic forces associated with movement of the occupant vehicle, the occupant 14 develops forward momentum which will tend to carry him forward from the vehicle seat 16 when the vehicle decelerates, as can be seen by the outline of the occupant 14 in phantom. This forward motion results in sudden payout of the restraint belt 12, which causes the payout reel 18 to lock, thereby eliminating further belt payout. In crash situations, the occupant's forward momentum will immediately exert an increased tensile force or load on the restraint belt 12 as it passes through the belt gripping device 10. This will cause the tensile force to reach quickly a predetermined amount, causing the belt gripping device 10 to clamp the restraint belt 12 tightly and preclude belt packing or belt stretching which would otherwise permit some continued forward movement of the occupant. In some crash situations, there will be occasions when strap acceleration will cause the reel 18 to lock but there is little remaining occupant momentum such that the gripping device 10 is not triggered. The reel can be unlocked and normal movement can continue.

Figure 2:
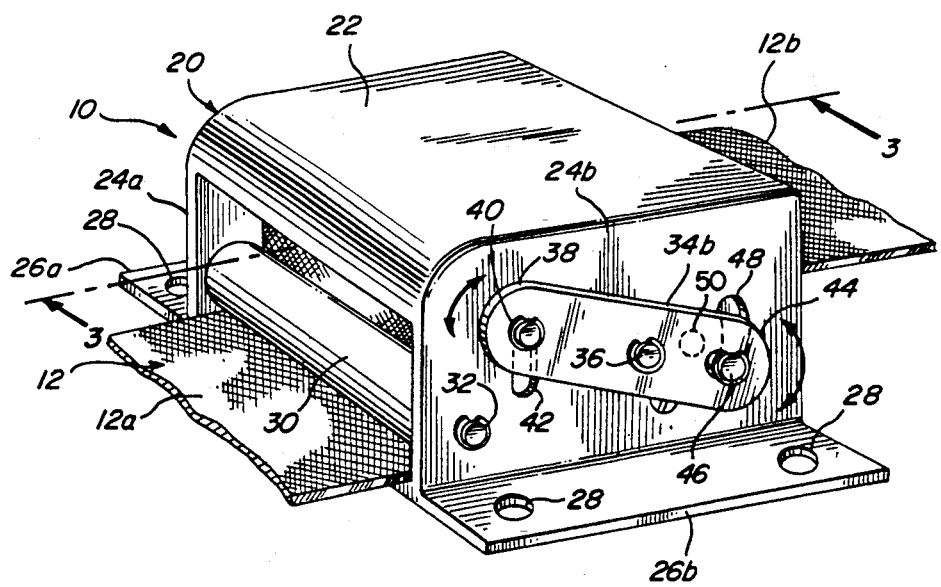
FIG. 2 is a side perspective view of the present invention belt gripping device.

Turning now to FIG. 2, it can be seen that the belt gripping device 10 comprises a U-shaped frame 20 defined by a protective cover face 22 having opposing side panels 24a and 24b and mounting flanges 26a and 26b, each of preferably unitary construction. The flanges 26a and 26b are provided with preferably two mounting holes 28 which accommodate a mechanical fastener (not shown) for mounting the belt gripping device 10 to a passenger vehicle.

In FIG. 2, a portion of the restraint belt 12 is shown passing through the belt gripping device 10. Preferably, the belt gripping device 10 is positioned so that a first portion 12a of the restraint belt 12 extends about the occupant 14 (FIG. 1) while a second portion 12b of the restraint belt 12 extends from the payout reel 18 (FIG. 1). It should be noted that components of the belt gripping device 10 not visible in FIG. 2 can be appreciated by reference to corresponding components on the visible side of the belt gripping device 10. Such corresponding components are of identical configuration.

Viewing from the left of FIG. 2, it can be seen that the restraint belt 12 extends about a first guide roller 30 rotatably supported about a first guide roller axle 32 which is, in turn, journaled within the side panels 24a and 24b. As the belt 12 moves through the belt gripping device 10, the guide roller 30 rotates to facilitate the passage of the restraint belt 12.

Housed partially within the belt gripping device 10 are several components which comprise a clamping assembly. The preferred embodiment of the clamping assembly includes first and second preferably identical, rotating lever arms, one of which is shown at 34b, on the exterior face of the side panel 24b. The lever arm 34a, Shown in FIG. 3A, is positioned on the exterior face of the side panel 24a and moves synchronously with pivotal movement of the second lever arm 34b. Both the first and second lever arms 34a and 34b pivot about a lever arm axle 36 extending through both side panels 24a, 24b and in the direction of the arrows shown in FIG. 2.

In the preferred embodiment, the lever arms 34a, 34b support other components of the clamping assembly housed within the frame 20. Journaled within a first end 38 of the lever arms 34a, 34b is a second guide roller axle 40 movable within a substantially vertical slot 42 in the side panel 24b. Supported from a second end 44 of the lever arms 34a, 34b is a first cam axle or pin 46 movable within a preferably arcuate slot 48 in the side panel 24b. As the lever arms 34a, 34b pivot about the lever arm axle 36, the second guide roller axle 40 is directed substantially linearly in the slot 42 in the opposite direction that the first cam axle 46 is moved within the arcuate slot 48. Note that the axle 46 extends through an opening in each lever that is slightly elongated in a generally horizontal direction. Such an opening can accommodate movement of the axle in an arcuate path.

Hidden behind the lever arm 34b is a second cam axle or pin 50 which is journaled within the side panels 24a, 24b. The first and second cam axles 46 and 50 support a clamping cam, discussed below in association with FIG. 3, which together with the first and second cam axles 46, 50 and the first and second lever arms 34a, 34b comprise the clamping assembly. At this point it should be appreciated that upon sudden increased load on the restraint belt 12 through the belt gripping device 10 (in response to locking of the belt by the reel locking assembly), movement of the clamping assembly components will be triggered, resulting in the restraint belt 12 being clamped against further movement.

Referring to FIG. 3, the first guide roller 30 shown in the lower right hand corner supported by the axle 32 spanning the side panels 24a and 24b (FIG. 2). Shown in phantom behind the side panel 24a is the first lever arm 34a. Positioned at the first end 38 of the lever arm 34a is a second guide roller 60 journaled about the second guide roller axle 40 and movable within the substantially vertical slot provided in both side panels 24a, 24b. With this configuration, the restraint belt 12 is permitted to travel through the belt gripping device 10 in a reciprocating fashion, as indicated by the arrows, and in a somewhat "S-shaped" configuration. The second portion 12b of the restraint belt 12, passing through the right side of the belt gripping device 10, slidably engages a ribbed surface 62 integral with an inward extension 64 of the protective cover face 22. The ribbed surface 62 is intended to engage, in a clamping fashion, a second ribbed surface 68 so as to sandwich the restraint belt 12 therebetween.

At the right end of the lever arms 34a, 34b is a rotatable clamping cam 66, comprising an elongate rigid bar spanning the side panels 24a and 24b (FIG. 2). The clamping cam 66 itself comprises a plurality of adjacent flat surfaces and includes the second ribbed clamping surface 68. While the clamping cam 66 is journaled about the first cam axle 46, it is also pivotable about the second cam axle 50. Rotation of the clamping cam 66 about the second cam axle 50 is directed by movement of the first cam axle 46 which is, in turn, directed by pivotal movement of the lever arms 34a and 34b. This coordinated movement will be described in more detail below.

The clamping cam 66 includes a first flat locking surface 72 and an adjacent second flat locking surface 74 both of which alternatively engage a lock assembly 76. As will be explained below, the lock assembly 76 exerts a continuous force against the clamping cam 66 in a manner which locks the clamping cam 66 in alternative "clamping" and "non-clamping" positions. In the preferred embodiment, the lock assembly 76 comprises a piston 80 movably supported in an opening 82 of a piston housing 84. Referring to FIG. 3A, while the piston 80 and the piston housing 84 may be of various configurations, the piston 80 is preferably cylindrical in shape and supported in a cylindrical opening 82. In addition, the piston housing 84 preferably has an elongate configuration and spans the side panels 24a and 24b. However, it is contemplated that the lock assembly 76 may be configured differently and still effectively function as described below. It is also contemplated that the present invention belt gripping device 10 be lockable only in a clamping position, thereby affecting the force required to trigger activation of the clamping assembly.

In FIG. 3, it can be seen that the piston housing 84 is rigidly supported by the lever arm axle 36 and includes a shoulder 86 in the opening 82 upon which rests at least one compression washer 88. In the preferred embodiment, the compression washer 88 is of a Bellville type, which continuously exerts an outward force on the underside of the piston 80. As the piston 80 alternatively engages the first and second locking surfaces 72 and 74 of the clamping cam 66, the force of the Bellville washers 88 against the piston 80 locks the clamping cam 66 in alternative clamping and non-clamping positions.

Still referring to FIG. 3, the clamping cam 66 is shown in a non-clamping fashion defined by positioning the second ribbed clamping surface 68 of the clamping cam 66 away from engagement with the first ribbed clamping surface 62 on the cover face 22. With this arrangement, the restraint belt 12 is permitted to freely travel within the belt gripping device 10. With the clamping cam 66 in a non-clamping position, the piston 80 is in compressive contact with the first locking surface 72 of the clamping cam 66, locking the cam in the nonclamping position. Since the pin 50 is fixed, the levers 34 cannot pivot without pivoting the cam 66, and the cam cannot pivot without compressing the Bellville washers 88.

Referring now to FIG. 3A, it can be seen that the belt gripping device 10 comprises the side panels 24a and 24b each sufficiently spaced to permit the passage of the restraint belt 12 therebetween. The side panels 24a and 24b support opposite ends of the first guide roller axle 32, the second guide roller axle 40, the lever arm axle 36, and the second cam axle 50. Further, the lever arms 34a and 34b are shown supported on the exterior surfaces of the side walls 24a and 24b, respectively which, in turn, support the second guide roller axle 40, the lever arm axle 36 and the first cam axle 46.

It may now be appreciated that operation of the clamping assembly entails unlocking the clamping cam 66 from the non-clamping position and re-locking it in a clamping position during periods of abrupt vehicle deceleration which result in increased load on the belt. This operation can be viewed from the sequence depicted in FIGS. 3, 4 and 5. As indicated above, the first portion 12a of the restraint belt 12 extends toward the buckle (not shown) adjacent the occupant's lower torso while the second portion 12b of the restraint belt 12 extends from the payout reel 18 (FIG. 1).

Referring specifically to FIG. 4, when the belt 12 undergoes a predetermined increased load as a result of the payout reel 18 locking, a downward force is exerted on the second guide roller 60 which causes the second guide roller 60 and the second guide roller axle 40 to move downwardly within the slot 42 as shown by the arrow 92. Because the second guide roller axle 40 is journaled within the lever arms 34a and 34b, downward movement of the second guide roller 60 forces the lever arms 34a and 34b to rotate in the direction of the arrow 94. In turn, the first cam axle 46 is directed upwardly thereby causing rotation of the clamping cam 66 about the fixed second cam axle 50 in the direction of the arrow 96. It should be appreciated from FIG. 4 that rotation of the clamping cam 66 in the counterclockwise direction, as shown, directs the second ribbed clamping surface 68 toward the first ribbed clamping surface 62 on the protective cover face 22.

Referring to FIG. 5, it will be appreciated that continued rotation of the clamping cam 66 in the same direction results in complete engagement of the first and second ribbed surfaces 62, 68, wherein the restraint belt 12 is clamped. In this position, the clamping cam 66 is locked in a "clamping" position by the lock assembly 76. Unlike conventional belt gripping devices, the present invention does not permit automatic unlocking of the device 10 from a clamping position in response to cessation of the load which triggered actuation of the clamping assembly. That is, there is no means provided for restoring the lever arms to the position of FIG. 3. Instead, manual force is required to move the levers and disengage the lock assembly 76.

With an understanding of the movement of the clamping cam 66 in response to increased strap load, operation of the lock assembly 76 in relation to the clamping cam 66 can now be described. As indicated above, the Bellville washers 88 continuously exert an outward force on the piston 80 which, in turn, compressively engages one of the two flat locking surfaces 72, 74 of the clamping cam 66. It should be appreciated then that in order to rotate the clamping cam 66 from a non-clamping position to a clamping position, the force of the Bellville washers against the piston 80 and the clamping cam 66 must be overcome. The Bellville washers 88 are intended to exhibit high compressive characteristics with a small amount of movement. The washers are selected to compress under a desired load on the belt. For example, a strap load of about 250 pounds is desirable. Normally the restraint belt 12 does not encounter such load in the direction of the arrow 90 in response to typical passenger movement or in response to strap acceleration that will lock the reel.

In order to cause rotation of the lever arms 34a and 34b and, ultimately, rotation of the clamping cam 66, a significant load must be exerted on the belt 12. Such a load is intended to result only from sudden deceleration of the vehicle causing the occupant to be thrown forward and locking of the payout reel. This sudden forward movement applied to the belt causes the payout reel 18 to lock. With the payout reel 18 locked and the occupant's weight still being directed against the restraint belt 12, sufficient load is exerted on the belt 12 to overcome the compressive resistance of the Bellville washers 88. Under such circumstances, the clamping cam 66 is directed by the pivoting lever arms 34a, 34b to rotate into a clamping position, as shown in FIGS. 4 and 5, thus sandwiching the restraint belt 12 between the ribbed clamping surfaces 62 and 68. In order to rotate the clamping cam 66, it is necessary to depress the piston 80 into the opening 82 of the piston housing 84. The piston 80 is depressed by the force of the clamping cam 66 as it rotates from a non-clamping position to a clamping position, or vice versa. The triggering force downwardly exerted on the second guide roller 60 causes rotation of the lever arms 34a and 34b and ultimately rotation of the clamping cam 66. The sequence of FIGS. 3–5 illustrates the movement of the piston 80 within the piston housing 84 in relation to rotation of the clamping cam 66. Upon complete rotation of the clamping cam 66, as shown in FIG. 5, the piston 80 is permitted to re-extend to its locking position, although engaging the second locking surface 74, rather than the first locking surface 72. As can be seen by comparing FIGS. 3 and 5, the dimension between the cam surface 74 and the surface 68 is much greater than the dimension between the cam surface 72 and the surface 73. With this arrangement, the restraint belt 12 is restricted from further movement through the belt gripping device 10, thus minimizing forward movement of the passenger in periods of abrupt vehicle deceleration.

In light of the above detailed description, the advantages of the present invention should be appreciated. With the improved belt gripping mechanism, belt packing about the payout reel is eliminated and the amount of the restraint belt subjected to "belt stretching" is effectively minimized. In addition, since the load on the restraint belt is transferred to the belt gripping mechanism, the reel locking assembly can be less rugged than would be required if the reel were to receive the entire load.

The invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed:

1. A belt clamping device, comprising:
 a first lever movable in response to a predetermined tensile load on a restraint belt caused by the locking of a belt payout reel;
 a second lever parallel to the first lever;
 a first guide roller axle secured to a frame;
 a first guide roller journal about the first guide roller axle;
 a second guide roller supported from a second end of each of said first and said second levers;
 a clamping cam secured to a first end of the levers, said clamping cam being movable relative to said levers into a clamping position responsive to predetermined movement of such levers; and
 a lock assembly engageable with the clamping cam for locking said clamping cam in said clamping position.

2. The device of claim 1, comprising:
 a first cam axle secured to the frame and extending through the clamping cam; and
 a second cam axle secured to the first end of the first and second levers, the clamping cam being journaled about the second cam axle so as to be rotatable between a clamping and non-clamping position by a predetermined load applied to the restraint belt against the second guide roller.

3. A belt restraining system, including a belt payout reel, with a restraint belt wound thereon for extension and retraction, and a belt clamping device, comprising:
 a first lever movable in response to a predetermined tensile load on a restraint belt caused by the locking of said belt payout reel;
 a clamping cam secured to a first end of the lever, said clamping cam being movable relative to said lever into a clamping position responsive to predetermined movement of such lever, said clamping cam comprising a first clamping face thereon and wherein a frame includes a second clamping face, said first and second clamping faces being adapted to clamp the restraint belt; and
 a lock assembly engageable with the clamping cam for locking said clamping cam in said clamping position.

4. A belt clamping device, comprising:
 a first lever movable in response to a predetermined tensile load on a restraint belt caused by the locking of a belt payout reel;
 a clamping cam secured to a first end of the levers, said clamping cam being movable relative to said levers into a clamping position responsive to predetermined movement of such levers; and
 a lock assembly engageable with the clamping cam for locking said clamping cam in said clamping position, said lock assembly comprising:
 a piston housing mounted to a frame, said piston housing including an opening with an interior shoulder;
 an extendable piston movable within the opening; and
 at least one compression washer secured about the piston and seated on the shoulder of the opening wherein said piston is continuously urged outwardly by the resistant force of said compression washer, said piston engaging alternatively first and second locking faces on the clamping cam.

5. A restraint belt clamping device, comprising:
 means for guiding a restraint belt through the belt clamping device;
 means for clamping the belt between surfaces to prevent further pullout of the belt upon the application of a predetermined payout load on said belt after payout of said belt is initially restrained; and
 means for locking and maintaining the surfaces together in a locked sate so as not be be releasable upon the cessation of forces which trigger the clamping of the belt and for preventing the extension and retraction of the belt relative to a belt payout reel, whereby manual force is required to unlock said surfaces.

6. A restraint belt clamping device, comprising:
 means for guiding a restraint belt through the belt clamping device;
 means for clamping the belt between clamping surface to prevent further payout of the belt only upon the application of a predetermined payout load on said belt after payout of said belt is initially restrained, said clamping means being unaffected by belt loads below said predetermined load;
 said clamping means comprising a rotatable clamping cam supported by, and pivotable relative to, first and second pivotable lever arm, said clamping cam including one of said clamping surfaces; and
 means for locking the clamping surfaces together in an effectively permanent manner.

7. A restraint belt clamping device, comprising:
 means for guiding a restraint belt through the belt clamping device;
 means for clamping the belt between clamping surface to prevent further payout of the belt only upon the application of a predetermined payout load on said belt;
 said clamping means comprising a rotatable clamping cam supported by, and pivotable relative to, first and second pivotable lever arm, said clamping cam including one of said clamping surfaces; and means for locking the clamping surfaces together in an effectively permanent manner, and wherein the guide means comprises a first guide roller secured to a first end of the first and second pivotable lever arms.

8. A restraint belt clamping device, comprising:

means for guiding a restraint belt through the belt clamping device;

means for clamping the belt between clamping surface to prevent further payout of the belt only upon the application of a predetermined payout load on said belt;

said clamping means comprising a rotatable clamping cam supported by, and pivotable relative to, first and second pivotable lever arm, said clamping cam including one of said clamping surfaces; and means for locking the clamping surfaces together in an effectively permanent manner.

wherein the guide means comprises a piston, housed within a piston housing, and at least one compression secured within an opening in said piston housing, said piston being continuously urged against the clamping cam by the force of the at least one compression washer.

9. A belt clamping device for clamping a belt securely therein, said device comprising:

a frame having a clamping surface positioned on said frame;

first and second pivotable levers mounted at opposite sides of the frame;

a roller supported at a first end of the levers for guiding said belt;

a clamping cam supported at a second end of the levers and being pivotable relative to said levers in response to a predetermined load applied to said belt in a belt extending direction, said clamping cam having a clamping surface engageable with the frame clamping surface upon the application of said load; and a lock assembly engageable with the clamping cam for securing said clamping cam in a clamping position for preventing the extension and retraction of the belt relative to a belt payout reel.

10. A system for locking a belt against further movement under instances of sudden severe vehicle deceleration, said system including an improved belt restraint device and a lockable belt payout reel supporting a portion of the belt, said belt restraint device comprising:

a frame having a clamping surface;

first and second levers pivotably responsive to a predetermined tensile load on the belt triggered by locking of the payout reel;

a clamping cam pivotably mounted to the levers and to be engageable with said clamping surface in a manner which clamps the belt between the clamping surface and the cam to prevent further belt payout; and a lock assembly engageable with the cam for locking said cam in engagement with the clamping surface for preventing the extension and retraction of the belt relative to the belt payout reel.

11. A restraint apparatus, comprising:

a belt payout reel;

a restraint belt having one end wound on said reel and a second end extendable from said reel for restraining a person in a seat, said reel being adapted to temporarily prevent belt extension in response to predetermined belt extending movement;

a belt gripping device for engaging said belt, with the device being located between said reel and said second end, said device including a belt clamp movable from a locked position wherein the belt is not gripped, to a locked position wherein the belt is gripped, in response to a predetermined belt extending load on said belt caused by the locking of said belt payout reel;

a lock assembly engageable with said clamp for locking said clamp in said locked position wherein said belt is gripped in an effectively permanent manner so as to not be immediately releasable upon the cessation of forces which triggered said clamp into said locked position wherein said belt is gripped; and said belt gripping device further including a pivotally mounted cam supporting said clamp.

12. A belt clamping device, comprising:

a frame having a pair of sidewalls;

a first belt guiding roller rotatably mounted in said sidewall;

a pair of levers pivotably mounted in said sidewalls with each lever being respectively located on the exterior of one of said sidewalls;

a slot in each of said sidewalls adjacent a first end of each of said pair of levers;

a first roller axle having opposite ends mounted in said first end of each of said pair of levers and extending through said slots so that when the first roller axle moves in said slot, each of said pair of levers is pivoted;

a second belt guiding roller mounted on said axle, said rollers being positioned to engage a belt moving through said device so that said second roller is moved in said slot when a predetermined belt extending load is applied to said belt;

a cam positioned between said rotatably mounted in said side walls about a fixed axis;

a cam pin slot in each of said sidewalls adjacent a second end of each of said pair of levers;

a cam pin having opposite ends mounted in elongated openings in the second ends of each of said pair of levers and extending slidably through said cam so that pivoting of said levers causes pivoting of said cam about said axis, said cam having a belt clamping position wherein a surface on said cam clamps the belt passing through said device guided by said rollers, against a fixed surface on said frame and a non-belt clamping position wherein said cam clamp is not in position to clamp said belt; and a cam lock mechanism urging said cam into said non-belt clamping position before said load is applied to said belt, in a belt extending direction, and urging said cam into the belt clamping position when said load is applied causing said belt guide roller axle and said levers to move in adjacent slots in said side walls and thereby cause said levers to pivot and in turn cause said cam to pivot and clamp said belt.

13. A belt gripping device, comprising:

a generally U-shaped frame having a protective face and two opposing side panels extending therefrom;

a first guide roller within the frame;

a first guide roller axle journaled within the side panels and supporting the first guide roller;

a lever axle secured to the side panels;

first and second lever arms being pivotable about the lever axle, each of the lever arms having first and second opposing ends, the first guide roller being positioned proximal to said first ends and distal from said second ends;

a second guide roller within the housing;

a second guide roller axle journaled within the first ends of the lever arms and supporting the second guide roller, said second guide roller axle extending through a first pair of slots in the side panels;

a first cam pivot pin secured to the two side panels;

a second cam pivot pin secured to the second ends of the lever arms, said second cam pin being positioned within a second pair of slots in the side panels;

a clamping cam secured between the two side panels and journaled about the first cam pin, said clamping cam also being journaled about the second cam pivot pin, said clamping cam being movable to a clamping position by a predetermined load on the restraint belt against the second guide roller;

a first clamping face on the clamping cam having a ribbed surface;

a second clamping face integral with the protective face of the housing having a ribbed surface thereon, said first and second clamping faces being engageable with each other to clamp a restraint belt therebetween;

first and second locking faces on the clamping cam; a lock assembly alternatively engageable with the first and second locking faces of the clamping cam so as to lock the clamping cam in alternative clamping and non-clamping positions.

14. The device of claim 13, wherein the lock assembly comprises:

a piston housing mounted between the side panels, said piston housing including an opening with an interior shoulder;

an extendable piston movable within the opening; and at least one compression washer secured about a portion of the piston and seated on the shoulder of the opening wherein said piston is continuously urged outwardly by the resistant force of said compression washers.

15. A method for clamping a restraint belt against further movement, comprising the steps of:

guiding the travel of the restraint belt through a frame supporting a clamping assembly and a lock assembly;

temporarily locking payout of said belt in response to a predetermined payout movement of said belt;

clamping said belt with said clamping assembly upon the application of a predetermined load after said locking; and locking the clamping assembly in belt gripping position in an effectively permanent manner so as not to be immediately releasable upon the cessation of said load which triggers said clamping and to prevent the extension and retraction of the belt relative to a belt payout reel.

16. The method of claim 15, wherein said clamping assembly and said lock assembly are located between said reel and a payout end of the belt during said clamping step.

17. A method for operating a restraint system to restrain a person in a vehicle seat with a belt wound on a reel and extending out from the reel to the person, said method comprising:

temporarily locking payout of said belt in response to a predetermined payout movement of said belt;

clamping said belt with a clamping assembly upon the application of a predetermined load on said belt generated as a result of said temporary locking in a crash situation;

locking the clamping assembly in belt gripping position in an effectively permanent manner so as not be be immediately releasable upon the cessation of said load which triggered said clamping and to prevent the extension and retraction of the belt relative to said reel.

* * * * *